United States Patent

Watanabe et al.

[11] 3,947,862
[45] Mar. 30, 1976

[54] EXPOSURE MULTIPLICATION INDICATING MEANS FOR AUTOMATIC EXPOSURE SETTING CAMERA

[75] Inventors: Koichiro Watanabe, Funabashi; Tetsuji Shono, Ranzan, both of Japan

[73] Assignee: Asahi Kogaku Kogyo Kabushiki Kaisha, Tokyo, Japan

[22] Filed: Jan. 30, 1975

[21] Appl. No.: 545,508

Related U.S. Application Data

[63] Continuation-in-part of Ser. No. 397,938, Sept. 17, 1973, abandoned.

[30] Foreign Application Priority Data

Sept. 21, 1972 Japan................................ 47-94929

[52] U.S. Cl................. 354/289; 354/58; 354/60 L
[51] Int. Cl.²..................... G03B 17/00; G03B 7/00
[58] Field of Search.......... 354/289, 58, 60 E, 60 L, 354/53

[56] References Cited
UNITED STATES PATENTS

| | | | |
|---|---|---|---|
| 3,668,993 | 6/1972 | Kurie | 354/289 X |
| 3,818,495 | 6/1974 | Sagara et al. | 354/60 L X |
| 3,839,723 | 10/1974 | Uno | 354/58 X |

*Primary Examiner*—L. T. Hix
*Assistant Examiner*—James LaBarre
*Attorney, Agent, or Firm*—Knobbe, Martens, Olson, Hubbard & Bear

[57] ABSTRACT

In one arrangement, the exposure multiplication indicating means includes an exposure multiplication selector dial having a small window cut therein and numerals marked thereon representing exposure multiplication, a film sensitivity dial, and an indicium. Numerals marked on said film sensitivity dial for representing the film sensitivity are observed, one by one, through said small window cut in the exposure multiplication selector dial, and the exposure multiplication is indicated by the numeral which is marked on the exposure multiplication selector dial in alignment with said indicium. In another arrangement, a main switch energizes the automatic exposure setting circuit and also energizes an element indicating the exposure multiplication setting. A source voltage confirming circuit enables the exposure multiplication indicating means to operate only when the source voltage is of a predetermined value.

6 Claims, 5 Drawing Figures

A

B

A

B

C

D

EXPOSURE MULTIPLICATION INDICATING MEANS FOR AUTOMATIC EXPOSURE SETTING CAMERA

CROSS REFERENCE TO RELATED APPLICATION

This is a continuation-in-part of pending U.S. Pat. application Ser. No. 397,938, filed Sept. 17, 1973, now abandoned.

This invention relates to an exposure multiplication setting means for manually varying the exposure determining factor which has been set automatically on the automatic exposure setting camera and, more particularly, to means for indicating that the exposure multiplication has been varied.

Many modern cameras adopt a program system, shutter speed value selection system or a diaphragm value selection system for obtaining automatic exposure settings. A disadvantage of these systems is that they provide a light measurement corresponding to average brightness in the object field which is not necessarily the exposure value desired by the photographer. For example, when a person is to be shot against the background of a back-light condition such as bright sky by the use of a camera of average light measuring type, the person that is the main subject to be shot will be underexposed due to the influence of the bright background. On the other hand, at night when shooting, for example, a neon sign against the dark background, the neon sign will be overexposed due to the darkness of the background. Also, there is sometimes a case that even when the subject is being illuminated almost evenly over the entire area and the automatic exposure setting is set normally, the photographic wishes to vary the set exposure to some improper value and carry out a photographing operation to obtain a peculiar effect.

To affect such an exposure correction or to vary the correct exposure value which has been set automatically, photographers have commonly varied the film sensitivity (ASA) setting value to some value other than the correct setting for the film actually employed. Since each of the exposure determining factors for a camera is represented by a series of multiple numbers (for example, the shutter speed is expressed by 1, ½, ¼, ⅛, 1/15, 1/30, 1/60, 1/125, 1/250, 1/500, 1/1000; the film sensitivity is expressed by ASA 25, 50, 100, 200, 400, 800, 1600 and 3200), the aforementioned device for intentionally correcting the exposure value or for varying the exposure setting will be called herein an exposure multiplication selecting means.

When shooting a person against a bright background by use of a camera of average light measuring type in which is loaded an ASA 200 film, the person will be underexposed if the shutter is released under automatic setting conditions. In such a case, the person can be shot with better exposure by varying the film sensitivity setting value to ASA 100, as if the film sensitivity were reduced, thereby increasing the exposure quantity by 2.

Such a conventional exposure correcting method, however, includes a critical disadvantage. When the photographer uses ASA 200 and ASA 100 films alternately at almost equal frequency, he may confuse or forget the sensitivity value of the film used with the sensitivity value having been varied unless he records the sensitivity value when loading the film. To eliminate such confusion, some cameras are provided with a holder for retaining a piece of paper cut from a box in which the film is packed. However, it is troublesome to cut the paper box to a correct size and insert it into the holder.

Accordingly, a need exists for an exposure multiplication indicating means not having the disadvantage of the conventional method and which is automatically operated as the exposure multiplication means, such as the film sensitivity setting, is varied. In one arrangement of the invention, there is provided an exposure multiplication selector dial having numerals marked thereon which correspond to the exposure multiplication when aligned with a fixed marker or other suitable indicium. A yet more convenient arrangement is to have the selector dial positioned over a film sensitivity dial with a window cut in the selector dial through which the film sensitivity can be observed. Thus, the photographer can tell at a glance the sensitivity of the film in the camera and the exposure multiplication selected.

In another arrangement, there is provided in addition to the automatic exposure setting means and the means for indicating the setting, an exposure multiplication indicating means which is adjusted by a means for multiplying the exposure. Thus, for example, the exposure multiplication indicating means may be an electrical circuit including one or more lamps which are selectively connected in the circuit by a switch which is connected to the means for varying the film sensitivity in the camera. This circuit may be connected to the main switch which controls the energization of the means for making the automatic exposure setting. Thus, when a multiplication setting has been made, an indication to that effect, such as a lamp being energized, is made during the light measurement operation so as to call this to the users's attention.

By employing a voltage confirming circuit to control energizing of the multiplication indicating means, energization of the indicating means may be made to occur only when there is sufficient voltage to operate the automatic exposure control means. Thus the lack of a multiplication indicating light warns the photographer that more voltage is needed.

For a more thorough understanding of the invention, reference may be had to the following description and drawings wherein.

Figure 1:
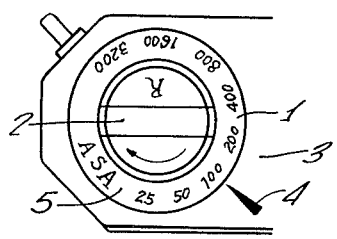
FIGS. 1A and 1B are plan views for explaining the conventional exposure multiplication varying method.
Figure 1:
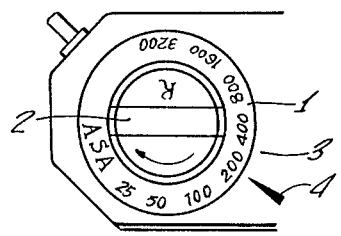

Referring first to the conventional arrangement of FIG. 1, there is shown a film sensitivity setting dial 1 which is arranged around the film rewinding knob 2. To set the sensitivity of the film loaded as an exposure determining factor for automatic exposure setting, any corresponding numeral marked on said film sensitivity dial can be brought into alignment with an indicium 4 marked on the camera body. For example, in using an ASA 100 film, the film sensitivity dial 1 can be set as shown in FIG. 1a; when using an ASA 200 film, the film sensitivity setting dial 1 can be set as shown in FIG. 1b. Under conditions when an ASA 100 is loaded as shown in FIG. 1a, and it is desired to reduce the exposure quantity by 50% at an early stage, the film sensitivity setting dial has to be set in such position as if an ASA 200 film is being loaded. The dial position after such setting is identical to that as shown in FIG. 1b and it is utterly indistinguishable whether such position is an initial setting position, an ASA 200 film or a setting position for any other film having varied the exposure multiplication.

On the other hand, when using an ASA 200 film as in FIG. 1b, the film sensitivity setting dial may be rotated so as to obtain an exposure quantity increased by two times. The position of dial 1 after having varied the exposure multiplication in this fashion, is utterly indistinguishable from the initial dial setting position for an ASA 100 film as shown in FIG. 1a. Therefore, unless the sensitivity of the loaded film is recorded or memorized correctly, the photographer will confuse the initial dial setting position with the dial setting position after having varied the exposure multiplication. Under these conditions, if the photographer fails to reset the dial to the original position, all the film frames thereafter will be over or underexposed.

Figure 2:
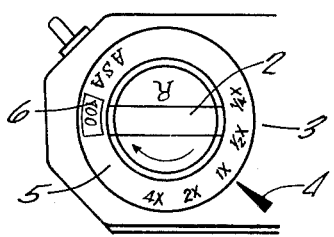
FIGS. 2A–2D are plan views of the exposure multiplication indicating means according to one embodiment of this invention.
Figure 2:
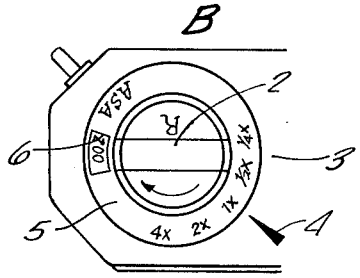
Figure 2:
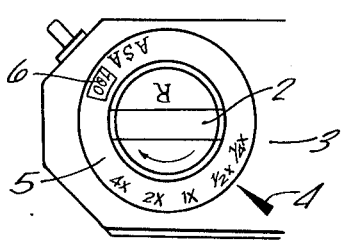
Figure 2:
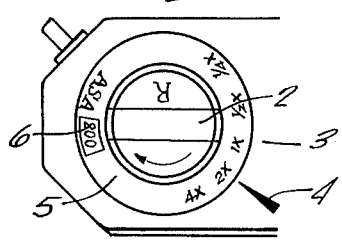

In contrast with this, the embodiment of this invention shown in FIG. 2 involves no such confusion. In FIG. 2, the parts corresponding to those of FIG. 1 are indicated with like reference numbers. The numerals marked on the film sensitivity dial 1 can be observed only through a small window 6 cut in an exposure multiplication selector dial 5 which is positioned over the film sensitivity dial 1, to be separately rotatable. In this embodiment, the indicium 4 is used not for setting the film sensitivity but for setting an exposure multiple number. FIG. 2a illustrates an initial dial setting position for an ASA 100 film, that is, the indicium 4 is aligned with 1X on the selector dial 5 indicating that there is no multiplication factor. Similarly, FIG. 2b illustrates an initial dial setting position for an ASA 200 film; FIG. 2c illustrates a dial position for an ASA 100 film after having varied the exposure multiplication to one half; and FIG. 2d illustrates a dial position for an ASA 200 film after having varied the exposure multiplication by two times.

To vary the dial position from A to C of FIG. 2 corresponds to varying the dial position from A to B of FIG. 1; whereas to vary the dial position from B to D of FIG. 2 corresponds to varying of the dial position from B to A of FIG. 1. Since the dial positions A, B, C and D of FIG. 2 show in the window 6 the inherent film sensitivity values at any time, the photographer will not be confused in distinguishing whether the actual dial position is an original dial setting or a setting after having varied the exposure multiplication. To effect a regular automatic exposure setting, the photographic needs only to bring the indicium 1X on the exposure multiplication selector dial 5 into alignment with the indicium 4.

Figure 3:
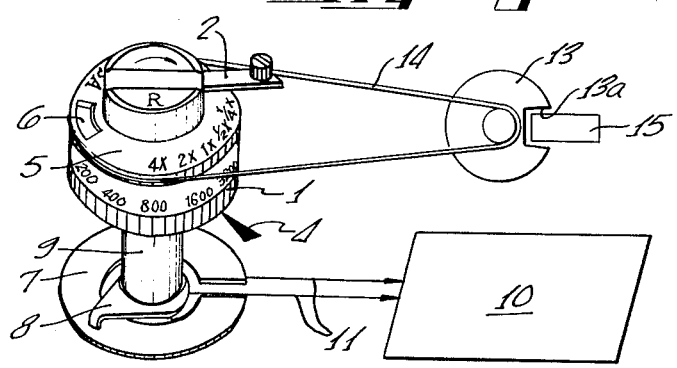
FIG. 3 is a fragmented perspective view of a portion of the device shown in FIG. 2, the view illustrating the relation between the film sensitivity setting resistor in the camera body and the exposure multiplication indicating means of the invention.

FIG. 3 illustrates the operational association between a film sensitivity setting resistor 7 arranged in the camera body 3, the film sensitivity setting dial 1 and the exposure multiplication selector dial 5. Again, the parts corresponding to those of FIG. 2 are indicated with like reference numbers. Indicated at 8 is a slide member which is operative in association with the film sensitivity setting dial 1 by means of a cylinder 9 arranged coaxially with the rewinding shaft (not shown). The slide member 8 is slidable over the film sensitivity member 7. The resistance value set is transferred to an automatic exposure setting circuit 10 by way of lead wires 11 so that the film sensitivity value is calculated in the automatic exposure setting 10. The thusly calculated film sensitivity value is then used as an exposure determining factor to control the exposure quantity.

As is seen from FIG. 3, the exposure multiplication selector dial 5 is arranged on top of the film sensitivity dial 1 and mounted to be independently rotated. When setting the film sensitivity, the photographer needs to rotate only the film sensitivity dial 1 without rotating the exposure multiplication selector dial 5 so that a numeral value representing the sensitivity of the film loaded can be observed through the small window 6 cutting the exposure multiplication selector dial 5. Simultaneously with rotating the film sensitivity setting dial 1 the slide member 8 slides over the film sensitivity setting resistor.

To vary the exposure multiplication, the photographer needs to rotate the film sensitivity setting dial 1 and the selector dial 5 simultaneously until any desired exposure multiplication numeral comes in alignment with the indicium 4. Such operation of varying the exposure multiplication accompanies a sliding movement of slide member 8 and hence changes the film sensitivity setting resistance. As a result, a calculation different from that which may otherwise be obtained in the original dial setting position will be obtained in the automatic exposure setting circuit 10 and the exposure quantity will be correspondingly varied. It is preferred to arrange a click mechanism or to impart a suitable friction between the exposure multiplication selector dial 5 and the camera body 3 and also between the selector dial 5 and the film sensitivity setting dial 1 so as to prevent the dials 5 and 1 to be rotated unintentionally during a photographing operation or while carrying the camera.

While the invention is described with reference to a preferred embodiment which is so designed as to be arranged around the film winding knob 2, the device of this invention may be arranged at any other suitable positions. Although in the shown and described embodiment the multiplication selector 5 is arranged on top of the film sensitivity setting dial, the dials 1 and 5 may be arranged separately so that they are operative in association with each other by use of gears or nay other suitable motion transmitting means. Furthermore, it is not essential to make the film sensitivity setting resistor in the form of a slide resistor, but a rotary switch may be employed conveniently for selecting an exposure multiplication.

It is also possible to provide a warning device by suitably arranging a string or any other motion transmitting means in association with the above described device arranged outside of the camera body 3 so that a preselected condition (for example, a red colored mark) appears in the viewfinder only when the exposure multiplication selector 5 is set to any position other than 1X. In such a case, the warning indication may be given in the viewfinder by use of the light from the subject. A schematic illustration of such a warning device is shown in FIG. 3 wherein a red warning disc 13 is rotated in either direction by a string 14 driven by the selector dial 5. The edge of the disc 13 overlaps a viewfinder 15. A notch 13a in the disc 13 is aligned with the viewfinder when the multiplication is 1X or normal, but movement of the disc 13 in either direction will put a red disc surface in the viewfinder, thus warning the photographer.

Figure 4:
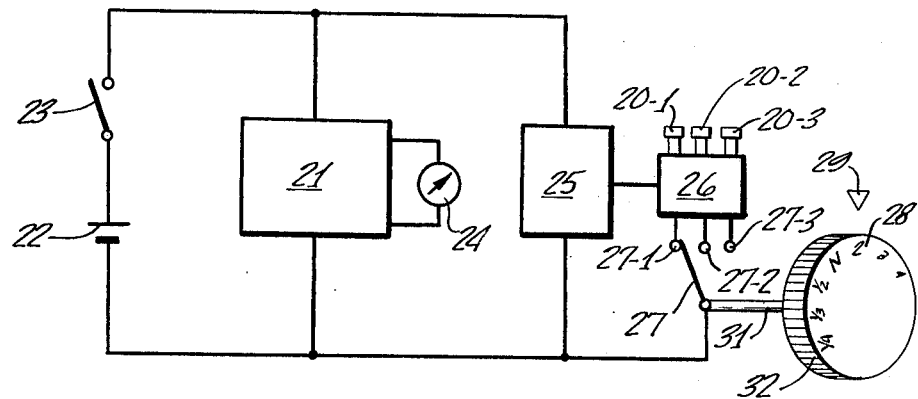
FIG. 4 is a circuit diagram of another embodiment of the present invention.

For a description of another exposure multiplication indicating means, refer now to FIG. 4 where there is shown a known exposure control circuit 21 containing a light measurement circuit, a computing circuit and an electrical-mechanical transformation circuit (for example, a magnet of diaphragm value selection type electronic shutter). Also illustrated is a current source 22, a circuit 25 for detecting the voltage of the current source 22 and controlling the operation of an indication circuit 26 including elements 20-1, 20-2 and 20-3, such as luminous diodes, an exposure indicating ammeter 24, a main switch 23, and a rotary switch 27 connected by a shaft 31 to a knob 32 having a reading plate 28 thereon, which components form an exposure multiplication means.

The reading plate 28 is located outside the camera body at some convenient location to be easily visible while the shaft 31 extends into the inside of the camera body. On the plate 28 two groups of indicating scales, i.e., 2, 3, 4 . . . and ½, ⅝, ¼ . . . are formed with a normal point N dividing the two scales. On the camera body a pointer 29 is provided to indicate the exposure multiplication selected.

The specific means for producing exposure muliplication is not shown, but there are known arrangements for doing this, one mentioned above being to alter the shutter time through film sensitivity variation means, such as that explained in connection with FIG. 3. The shaft 31 may be connected directly or indirectly to such film sensitivity variation means inside the camera.

In accordance with the embodiment of FIG. 4, when the main switch 23 is closed, such as by operating shutter control means (not shown), exposure control circuit 21 operates so that a proper exposure value is automatically determined. This value is indicated by the ammeter 24, and thus the user can know this automatically determined value. If this value is different from the value desired by the user, he can obtain such desired value by operating the exposure multiplication reading plate 28, and establishing the exposure multiplication value. Manually operating the reading plate 28 also operates the rotating switch 27 to mate with one of the switch contacts 27-1, 27-2, or 27-3 leading to the indication circuit 26.

As the manner of indication, the circuit 26 and the rotary switch 27 are so arranged that the exposure multiplication value is directly indicated by energization of one of the light emission diodes 20-1, 20-2 or 20-3.

Alternatively, a lamp may be lit for indicating only that the exposure multiplication means is set other than normally. As one example, the indicating element may be lit when multiplication changes in such a manner as 2, 3, 4, etc. and it may be flickered when multiplication changes in such as ½, ⅓, ¼, etc. Yet another alternative method of indicating the exposure multiplication condition is to have one light lit only when the multiplication changes in such a manner as 2, 3, 4, etc. and another light lit only when the multiplication changes in such a manner as ½, ⅓, ¼, etc.

The indicating lights may be physically located in any convenient location visible from the outside of the camera. However, as suggested above, the most effective arrangement is to locate the lights inside the viewfinder. Adjacent the eyepiece of the viewfinder is also a convenient location.

Figure 5:
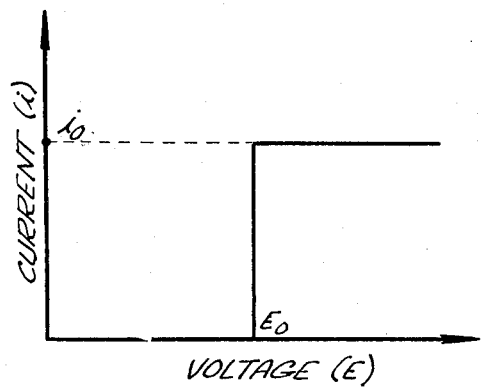
FIG. 5 is a graph showing the characteristic of current in the essential part of the example shown in FIG. 4.

The circuit 25 is a voltage detecting switch circuit which so acts that the indication circuit 26 is operative with current i0, referring to FIG. 5, only when the voltage of the current source 22 is higher than a certain value E0. Thus the circuit 25 in cooperation with the circuit 26 and the switch 27 confirms the source voltage for the exposure control circuit 21. That is, if a luminous diode 20 is lit, there is sufficient source voltage for proper performance of the shutter control means including the automatic exposure determining means. Various arrangements may be employed in the circuit 25 to perform the desired function. For instance, a transistor may be utilized with the emitter collector electrodes in series in the base and the transistor is given bleeder output of the current source controlled by a constant voltage diode. Alternatively, a common Schmitt trigger circuit may be employed. An additional circuit for temperature compensation may also be needed.

Thus, when the above mentioned exposure multiplication indicating means according to the present invention, is attached to the automatic exposure control cameras, alarm is given for such erroneous manual operation as wrong exposure multiplication establishment, or forgetting of operation exposure multiplication. Accordingly, the user can operate the exposure multiplication means with a greater feeling of confidence.

What is claimed is:

1. In a camera the inventive combination comprising:
  an automatic exposure setting means;
  means for indicating the exposure setting determined by said exposure setting means;
  means for multiplying the exposure setting so as to set the exposure at some value other than that automatically determined;
  means for indicating the multiplication of said exposure setting by said exposure multiplying means; and
  means connecting the exposure multiplying means and the multiplication indicating means so that the multiplication indicating means automatically indicates the multiplication as the multiplying means is set.

2. A camera comprising:
  an exposure control circuit;
  means for indicating the exposure setting;
  an exposure multiplication indicating circuit connected to be energized with said exposure control circuit;
  adjustable exposure multiplication means to modify the camera exposure setting;
  switch means operated by said multiplication means connected to said exposure multiplication indicating circuit to control the indicating circuit in accordance with the setting of said multiplication means; and
  main switch means connected to control the energization of said circuits.

3. The camera of claim 2 including luminous indicating means energized by said exposure multiplication indicating circuit to correspond to the setting of said multiplication means.

4. The camera of claim 3 including a voltage confirming circuit connected to said exposure multiplication indicating circuit to enable said indicating circuit to be energized only when a predetermined voltage is available so that the camera operator is warned by the absence of the luminous indicating means that the voltage for operating the circuits is inadequate.

5. A method of indicating the condition of a camera exposure multiplication setting, comprising:

modifying an automatic exposure control setting by adjusting the setting of exposure multiplication means; and automatically indicating the setting of the exposure multiplication means as the exposure multiplication means is set, in addition to indicating the exposure control setting.

6. The method of claim 5 wherein the exposure multiplication is indicated by energizing light means located on the camera.

* * * * *